Nov. 15, 1932.  O. C. HEMP  1,887,714
VEGETABLE GRATER
Filed May 22, 1930
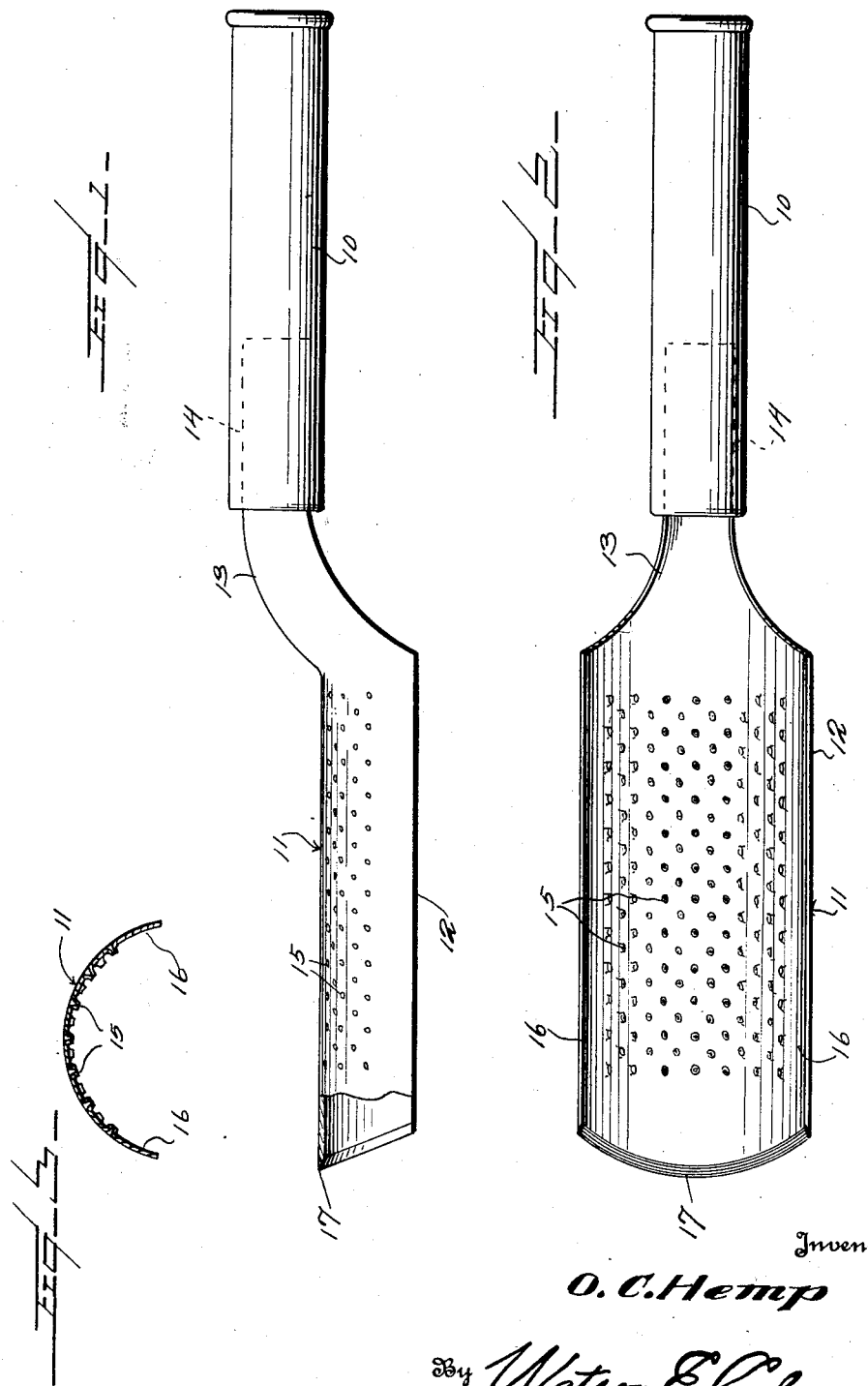
Inventor
O. C. Hemp
By Watson E. Coleman
Attorney Patented Nov. 15, 1932

1,887,714

UNITED STATES PATENT OFFICE

OMRI CLYDE HEMP, OF STAUNTON, VIRGINIA

VEGETABLE GRATER

Application filed May 22, 1930. Serial No. 454,760.

This invention relates to grating devices and more particularly to a hand operated grater which is adapted for use in removing pulp from green corn or other vegetables.

An object of this invention is to provide a handy and efficient grater which is so constructed as to engage a plurality of rows of corn kernels.

Another object of this invention is to provide in a device of this kind a shield which is formed integrally with the grater so that the fruit or vegetable juices will drop into the receptacle which is used for holding the pulp being cut from the vegetable.

A further object of this invention is to provide a grater with a keen edge at one end thereof so that the grater may also be used for cutting the fruits or vegetables.

The above and various other objects and advantages of this invention will in part be described in and in part be understood from the following detailed description of the present preferred embodiment, the same being illustrated in the accompanying drawing wherein:—

Figure 1 is a detail side elevation partly in section of a device constructed according to the preferred embodiment of this invention;

Figure 2 is a detail bottom plan view of the device; and

Figure 3 is a transverse sectional view taken through the grating member.

Referring to the drawing wherein like numerals of reference designate corresponding parts throughout the several views, the numeral 10 designates a handle of desired length and size upon which is mounted a grater generally designated as 11. The grater 11 comprises an elongated body portion 12 which is provided at the rear end thereof with an upwardly inclined or offset portion 13 which terminates in a parallel extension 14 which is adapted to be mounted in the handle 10, being secured therein by any desired means.

The body 12 of the grater 11 is preferably formed as a segment of a circle so that the body may readily be positioned about the periphery of fruit or vegetables and particularly about the periphery of an ear of corn. The body 12 is provided with a plurality of staggered and inwardly projecting teeth or tines 15 which terminate at a point spaced inwardly from the marginal edge portions of the body 12, the portion of the body 12 extending outwardly from the tines 15 providing a shield 16 so as to protect the operator of the device from the fruit or vegetable juices and so as to cause the juices together with the pulp to drop into a receptacle or the like.

The outer end of the body portion 12 is provided with a keen edge 17 so that when it is desired to cut the fruits or vegetables, the instrument may be held in substantially vertical position in the hand and used in the form of a chopper or the like. The keen edge 17 is also of particular advantage when it is desired to cut the kernels of corn from the cob without using the grater portion 15.

The grater members 15 are preferably constructed by punching a plurality of holes in the body 11, the holes being staggered substantially throughout the portion 12, the punched out material extending inwardly of the body 12 and providing the desired grating or scraping members 15.

In the use of this device the handle 10 may be grasped in the hand and the concave body member 12 oscillated or rubbed on the periphery of an ear of corn, or other vegetable, so as to remove the pulp and kernels of corn. The outer edge portions 16 of the grater provide suitable shield members for shielding the operator from the fruit or vegetable juices and also serve as retaining members for holding the juices so that they will fall into the pan with the pulp. When it is desired to cut the fruits or vegetables, the device may be held in substantially vertical position in the hand so that the sharpened edge 17 may be used as a chopper or the like.

It will be obvious from the foregoing that an exceedingly simple and at the same time practical device has been disclosed which will facilitate the removal of kernels of corn and which is so constructed that it may be used for various other articles which it is desired to clean or cut.

It is, of course, understood that various changes and modifications may be made in the details of construction and design of the above specifically described embodiment of the invention without departing from the spirit thereof, such changes and modifications being restricted only by the scope of the following claims.

What is claimed is:—

A grater of the character described comprising a handle, a concave body portion, means for securing said body portion in offset parallel relation to said handle, said means including a longitudinally curved stem arcuate in cross section, a plurality of grating members integrally formed with said body portion, a pair of shield members secured to said body portion and extending outwardly from said grating member, and a cutting edge positioned on the outer end of said body.

In testimony whereof I hereunto affix my signature.

OMRI CLYDE HEMP.